Figure 1:
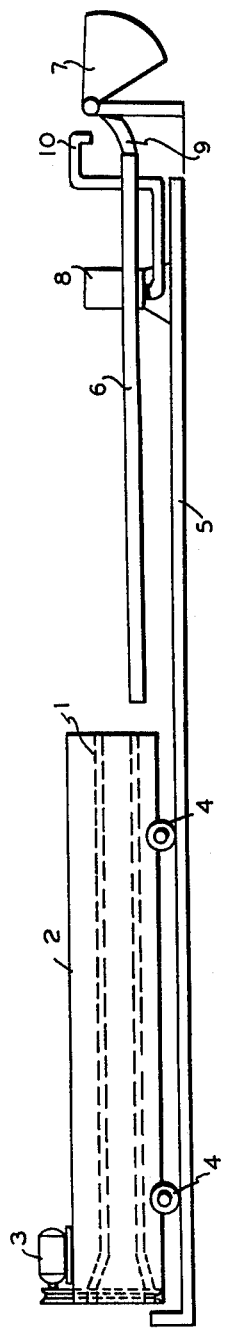

May 4, 1965 W. A. MONTGOMERY 3,181,210
CENTRIFUGAL CASTING APPARATUS
Filed Jan. 29, 1962

WILLIAM A. MONTGOMERY
INVENTOR.

BY

ATTORNEY

United States Patent Office 3,181,210
Patented May 4, 1965

3,181,210
CENTRIFUGAL CASTING APPARATUS
William A. Montgomery, Hayward, Calif., assignor to United States Pipe and Foundry Company, Birmingham, Ala., a corporation of New Jersey
Filed Jan. 29, 1962, Ser. No. 169,269
2 Claims. (Cl. 22—65)

In the manufacture of pipe by the De Lavaud process the metal is introduced into and distributed along the mold by means of a long trough which extends the length of the mold. After each pipe has been cast, it is necessary to apply blacking slurry to the trough and to remove the metal splinter which remains and solidifies. The application of blacking slurry serves to cool the metal remaining in the trough so that it may be immediately removed, and in addition it cools the trough to prevent overheating and provides the trough surface with a protective coating against metal erosion during the next cast. If the trough is not kept properly blacked the splinter will not be easily removed and the trough will become damaged. Also, care must be taken that the trough does not become overheated and that it does not become warped due to uneven cooling. The annular clearance between the trough exterior and the mold interior is relatively small, thus alignment of the trough is very critical. Any warpage of the trough will create difficulties because of the relative co-axial movement of the trough and mold.

Increased casting rates which have been obtained through improved technology result in less time being allotted during each cycle for the troughman's duties to be performed. As casting rates go up, the tendency toward overheating, warpage and erosion of the trough are greatly increased due to the greater number of casts per given time. Accordingly, as it becomes ever more important that the trough blacking operation be carefully carried out, the troughman must do it in less time.

It has universally been the practice for the blacking operation to be carried out manually by means of a hand dipper. The result of this is that the amount of blacking supplied varied considerably from cycle to cycle, and it is apparent that the point of application would also vary. These factors, and particularly the latter, are important in that if the blacking is not properly applied the trough will erode and warp. Even at slower casting rates manual blacking created difficulties, however, as casting rates increase it becomes increasingly more difficult to manually introduce trough blacking in the correct quantity and clean the trough properly in the time available between casting cycles. Spillage over the sides of the trough and variations in point of application adversely affect the physical stability of the trough and time is lost when corrections are necessary to maintain proper position in relation to the end of the mold.

Accordingly, this invention has for its object the provision of an apparatus for the application of a controlled amount of blacking material to the same predetermined area of the trough during each cycle.

Figure 2:
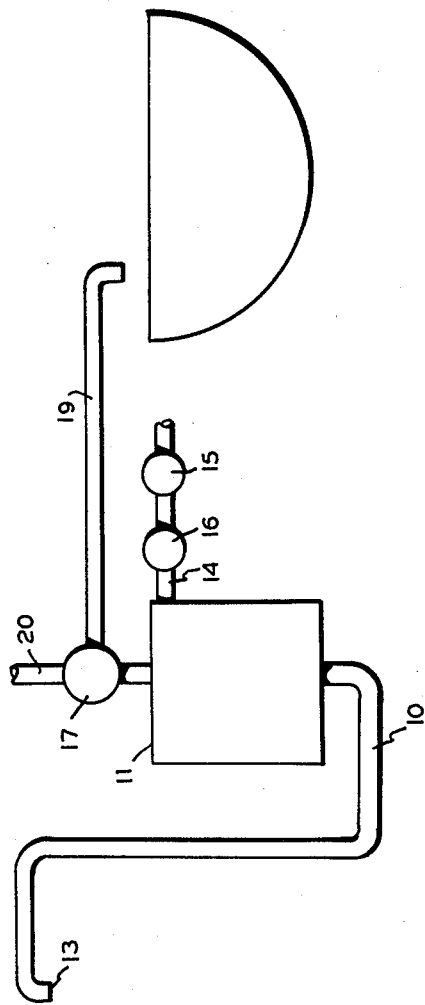

The invention will be clearly understood from the following description and the drawings in which:

FIGURE 1 is an elevation of a centrifugal pipe machine provided with the improvement of this invention, and FIGURE 2 is an enlarged view of the blacking dispensing apparatus which is the specific object of the invention.

In FIGURE 1, the centrifugal metal mold 1 is rotatably mounted in water box 2. The motor for turning the mold in the water box is designated 3 and suitable drive such as poly-V drive is provided. The water box is mounted on wheels 4 and may be moved up and down inclined track 5 by means of a hydraulic cylinder, not shown. A casting trough 6 is mounted at the uphill side of the inclined track 5 and is positioned so as to enter the mold when the water box is moved up the incline. Adjacent the end of the casting trough there is mounted machine ladle 7 which is of the type that gives a constant discharge when tilted at a uniform rate. The end of the pouring trough adjacent the machine ladle is provided with casting chute 9 to direct molten metal from the ladle spout into the trough.

In the vicinity of the machine ladle 7 there is mounted blacking dispenser 8 which is provided with a discharge line 10, the discharge end of which is positioned over the casting chute 9. The particular location of the equipment is not critical, but it is preferably located in the vicinity of the machine ladle but in a position which will not interfere with the free movement of the casting crew along pouring trough 6 and about machine ladle 7.

Referring now to FIGURE 2, the blacking dispenser is seen to comprise a measuring container 11 of predetermined volume. The volume of blacking slurry of course depends upon many factors, such as blacking slurry composition, trough size, casting rate, etc. However, for a blacking mix of the following composition:

Water _____ gal__ 1200
16 Mexican graphite _____ lbs__ 300
Dry bentonite _____ lbs__ 25 containers of the following sizes are adequate:

Quarts
6" pipe _____ 3
8" pipe _____ 5
10" and 12" pipe _____ 6
14" and 16" pipe _____ 7

A discharge line 10 is connected to the bottom of the container and runs from the measuring container 11 to a point above the casting chute 9 adjacent the machine ladle lip. The discharge end 13 of the discharge line is positioned so as to give the proper flow of blacking slurry into the pouring trough. The correct position can be readily determined, and once properly adjusted can be easily maintained.

Blacking slurry is carried to the measuring container through supply line 14 from a remote storage tank, not shown. A low volume pump 15 and adjustable throttle valve 16 are provided in this line and the flow of blacking slurry is controlled to assure that the measuring container is filled in the time between casting cycles.

A third line runs from the top of the measuring container to a three-way valve 17. Connected to the three-way valve are overflow line 19 and air supply line 20. The three-way valve in its normal position is set so that the overflow line 19 is connected to the measuring container. Thus when the measuring container becomes filled, the further flow of blacking slurry will discharge through the overflow line. This overflow line 19 may discharge into a blacking tank at the casting machine to provide a supply of blacking slurry for other use at the casting machine, or the discharge line may return to the remote storage tank, thus providing recirculating flow.

When the position of the three-way valve is changed, the air supply line becomes connected to the measuring container. The closing of the overflow line and the application of air pressure to the blacking slurry in the measuring container forces the blacking slurry out the discharge line 10 into the pouring trough. To obtain the desired operation of the apparatus the rate of slurry flow in the supply line, the air pressure and height difference between the discharge line and the overflow line must be correlated so that overflow will discharge only through the overflow line. For example, when the amount of blacking delivered by the pump during a casting cycle is only slightly in excess of the container volume a satisfactory operation will be obtained if the discharge 13 is twelve inches above the overflow line 18.

As illustrated in FIGURE 2, the three-way valve is provided with manual control. However, operation of the apparatus may be made automatic by use of a solenoid operated three-way valve which is energized by a limit switch tied in with either the ladle dumping mechanism or casting machine travel.

To those skilled in the art to which this invention relates, many changes in construction and widely differing embodiments of the invention will suggest themselves. These variations which depart from the illustrative embodiment set forth herein may be made without departing from the scope of the invention as it is hereinafter claimed.

I claim:

1. A centrifugal pipe casting apparatus comprising an axially elongated mold rotatably mounted about its longitudinal axis, an elongated pouring trough mounted in substantially axial alignment with said mold, means for delivering molten metal to said pouring trough at a controlled rate, a container of predetermined capacity, an input line for delivering blacking slurry to the container, means for controlling the rate of slurry delivery to the container a discharge line for delivering the contents of the container to the pouring trough, an overflow line for the discharge of excess blacking slurry from the container and a three-way valve connected to the discharge line in a manner to permit the closing of the overflow line and the interconnecting of an air line to said container whereby the contents of the container are forced out through the discharge line.

2. A centrifugal pipe casting apparatus comprising an axially elongated cylindrical mold rotatably mounted about its longitudinal axis, an elongated pouring trough mounted in substantially axial alignment with the bore of the mold, means for providing relative longitudinal movement between the mold and trough to cause the spout end of the trough to traverse substantially the entire length of the mold, means for pouring metal at a controlled rate into the trough at the end remote from the spout end, a container of predetermined capacity, an input line for delivering blacking slurry to the container, a discharge line for delivering the blacking slurry from the container to the pouring trough, an overflow line for the discharge of excess blacking slurry from the container and a three-way valve connected in said discharge line in a manner to permit the closing of the overflow line and the interconnecting of an air line to said container.

References Cited by the Examiner
UNITED STATES PATENTS

| 1,963,150 | 6/34 | Russell et al. | 22—65 |
| 1,971,376 | 8/34 | Hunt et al. | 22—65 |
| 2,763,041 | 9/56 | Doat | 22—65 |

MICHAEL V. BRINDISI, *Primary Examiner.*

WINSTON A. DOUGLAS, *Examiner.*